(12) United States Patent
Krause et al.

(10) Patent No.: US 11,685,343 B2
(45) Date of Patent: *Jun. 27, 2023

(54) PRODUCT METERING SYSTEM

(71) Applicant: Cleaning Systems, LLC, DePere, WI (US)

(72) Inventors: David R. Krause, DePere, WI (US); Donald J. Pansier, Green Bay, WI (US); Daniel J. Mathys, Pulaski, WI (US)

(73) Assignee: Cleaning Systems, Inc., De Pere, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/113,375

(22) Filed: Dec. 7, 2020

(65) Prior Publication Data

US 2021/0086728 A1 Mar. 25, 2021

Related U.S. Application Data

(63) Continuation of application No. 15/942,993, filed on Apr. 2, 2018, now Pat. No. 10,857,982, which is a continuation of application No. 15/619,740, filed on Jun. 12, 2017, now Pat. No. 9,932,018, which is a continuation of application No. 13/011,493, filed on Jan. 21, 2011, now Pat. No. 9,676,371, which is a continuation-in-part of application No. 12/203,510, filed on Sep. 3, 2008, now abandoned.

(51) Int. Cl.
*B60S 3/04* (2006.01)
*F16K 31/06* (2006.01)

(52) U.S. Cl.
CPC ............ *B60S 3/04* (2013.01); *F16K 31/0675* (2013.01)

(58) Field of Classification Search
CPC .. B60S 3/04; B60S 3/044; B60S 3/047; A47L 15/4418; A47L 15/4463; A47L 15/449
USPC .................................. 134/123, 99.2, 100.1
See application file for complete search history.

(56) References Cited

U.S. PATENT DOCUMENTS

2003/0127534 A1* 7/2003 Firestone ............ B01F 35/2111
239/69

\* cited by examiner

*Primary Examiner* — David G Cormier
(74) *Attorney, Agent, or Firm* — Benesch, Friedlander, Coplan & Aronoff LLP

(57) ABSTRACT

A product metering system for accurately dispensing one or more products. The product metering system generally includes a vehicle wash product supply fluidly connected to an electronic control valve and a control unit in communication with the electronic control valve. The electronic control valve operates at an open/close ratio that dispenses the product supply at a desired flow rate.

18 Claims, 8 Drawing Sheets

PRODUCT METERING SYSTEM

CROSS REFERENCE TO RELATED APPLICATIONS

This application claims priority to and is a continuation application of U.S. patent application Ser. No. 15/942,993 filed on Apr. 2, 2018 which claims priority to and is a continuation of U.S. patent application Ser. No. 15/619,740 filed on Jun. 12, 2017 and issued on Apr. 3, 2018 as U.S. Pat. No. 9,932,018 which claims priority to and is a continuation of U.S. patent application Ser. No. 13/011,493 filed on Jan. 21, 2011 and issued on Jun. 13, 2017 as U.S. Pat. No. 9,676,371 which claims priority to and is a continuation-in-part of U.S. application Ser. No. 12/203,510 filed Sep. 3, 2008. The entire contents of each of these applications are incorporated herein by reference.

FILED OF INVENTION

The present invention relates generally to product dispensers for vehicle washes and more specifically it relates to a product metering system for dispensing one or more products in an efficient manner.

BACKGROUND

Any discussion of the related art throughout the specification should in no way be considered as an admission that such related art is widely known or forms part of common general knowledge in the field.

Vehicle washes are comprised of various types of facilities capable of washing various types of vehicles (e.g. cars, trucks, planes, trains) such as but not limited to self-service manual vehicle washes, in-bay automatic vehicle washes, and tunnel vehicle washes. Vehicle washes dispense various types of products including but not limited to water, detergent, protective coatings (e.g. wax, polish), tire dressing, coloring, spot free rinse and the like.

A vehicle wash needs to accurately control the amount of product dispensed to ensure a quality wash of a vehicle and to avoid wasting costly products. Vehicle washes currently utilize various orifice sizes to meter a product (e.g. detergent, spot free rinse) into a flow of water. One problem with utilizing orifices to meter products is that they can become partially or fully blocked thereby undesirably modifying the product dispensing ratio. Another problem with utilizing orifices within a vehicle wash is that if the mix ratio of two products is desired, the orifices have to be replaced which is time consuming, expensive and prone to human error. Another problem with utilizing orifices within the vehicle wash is the orifice is in the product flow thereby contact with the product being metered is unavoidable when disassembling.

Because of the inherent problems with the related art, there is a need for a new and improved product metering system for effectively combining two products within a vehicle wash.

BRIEF SUMMARY OF THE INVENTION

The general purpose of the present invention is to provide a product metering system that has many of the advantages of the vehicle wash product dispensers mentioned heretofore. The invention generally relates to a product dispenser which includes a vehicle wash product supply fluidly connected to an electronic control valve and a control unit in communication with the electronic control valve. The electronic control valve operates at an open/close ratio that dispenses the product supply at a desired flow rate.

There has thus been outlined, rather broadly, some of the features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

An object is to provide a product metering system for effectively combining two products within a vehicle wash.

Another object is to provide a product metering system that is capable of combining various types of products such as but not limited to liquid (e.g. detergents, water, coloring, wax) and powder.

An additional object is to provide a product metering system that ensures a desired proportion of two or more products.

A further object is to provide a product metering system that provides adjustable product ratios.

Another object is to provide a product metering system that precisely meters a product flow.

Another object is to provide a product metering system that is capable of supplying precise amounts of product into systems requiring either pressure or a vacuum.

Another object is to provide a product metering system that maintains a consistent product ratio and does not become blocked.

Another object is to provide a product metering system that may be utilized to produce various colors within a vehicle wash.

Another object is to provide a product metering system that may be utilized to produce various scents within a vehicle wash.

A further object is to provide a product metering system that is capable of accurately dispensing one or more products in an efficient manner.

Other objects and advantages of the present invention will become obvious to the reader and it is intended that these objects and advantages are within the scope of the present invention. To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

A. Overview

Figure 1:
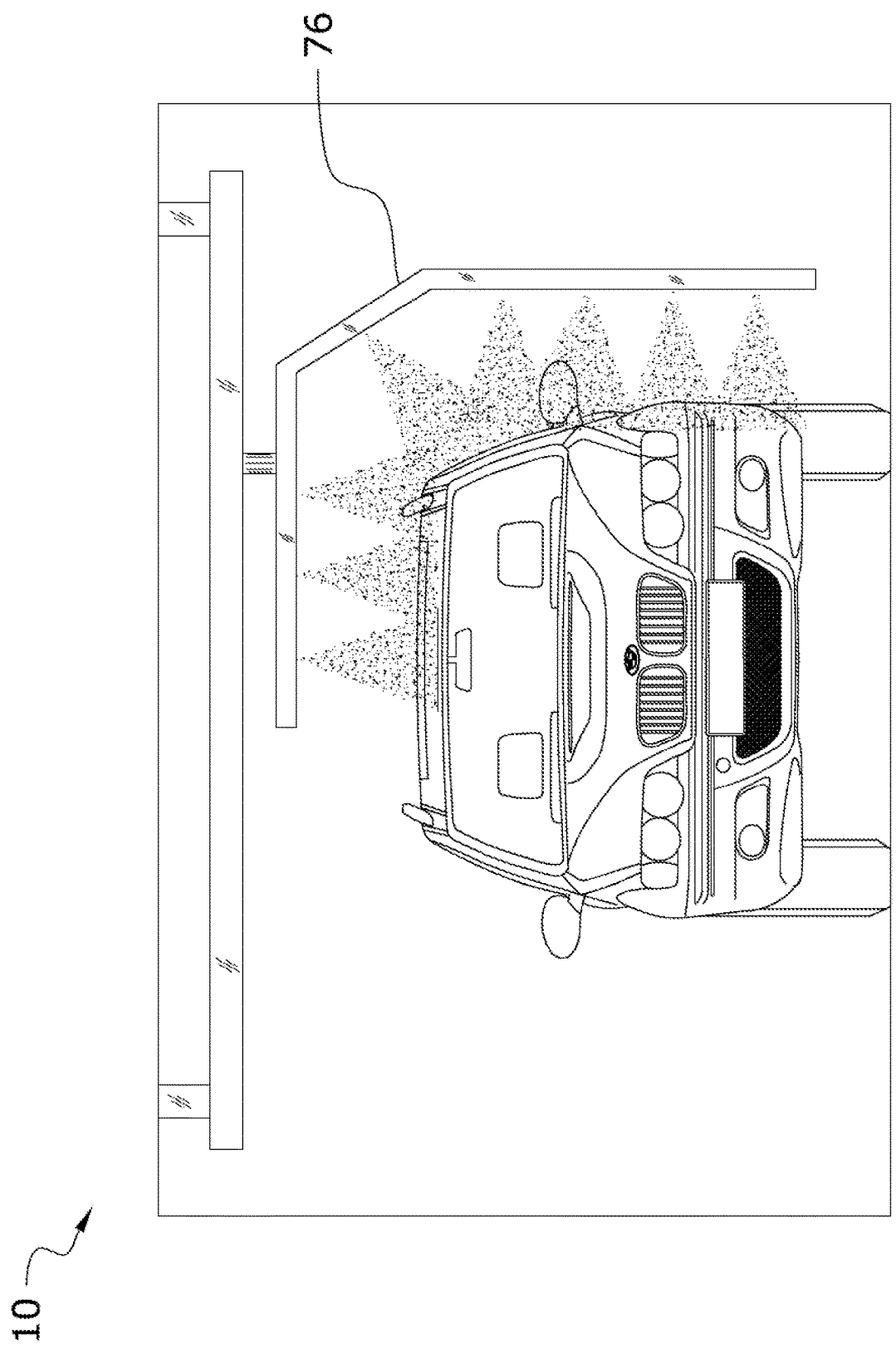
FIG. 1 is a front view of a vehicle wash dispensing product on a vehicle.

Turning now descriptively to the drawings, in which similar reference characters denote similar elements throughout the several views, FIGS. 1 through 8 illustrate a product metering system 10, which comprises a vehicle wash product supply fluidly connected to an electronic control valve and a control unit in communication with the electronic control valve. The electronic control valve operates at an open/close ratio that dispenses the product supply at a desired flow rate.

B. Vehicle Wash

The present invention may be utilized with various types of vehicle washes. Vehicle washes are comprised of various types of facilities capable of washing various types of vehicles (e.g. cars, trucks, planes, trains). FIG. 1 illustrates an exemplary vehicle wash comprised of an "in-bay" vehicle wash system. It can be appreciated that the vehicle wash may be comprised of various other types of vehicle washes including automatic tunnel vehicle washes and self-service manual vehicle washes.

The vehicle wash has at least a first product supply 20 comprised of a liquid, a powder, particulate material, a gas, a fluid or the like. The first product supply 20 is preferably metered into a flow of water prior to being dispensed by the product dispenser 76. The first product supply 20 may be comprised of any product used in a vehicle wash including but not limited to water, cleaning products (e.g. detergent), scented product, protective products (e.g. wax, sealant), tire dressing, coloring product, spot free rinse and the like. As shown in FIG. 1 of the drawings, the first product supply 20 is applied to the vehicle within the vehicle wash via the product dispenser 76 (e.g. nozzle).

Figure 2:
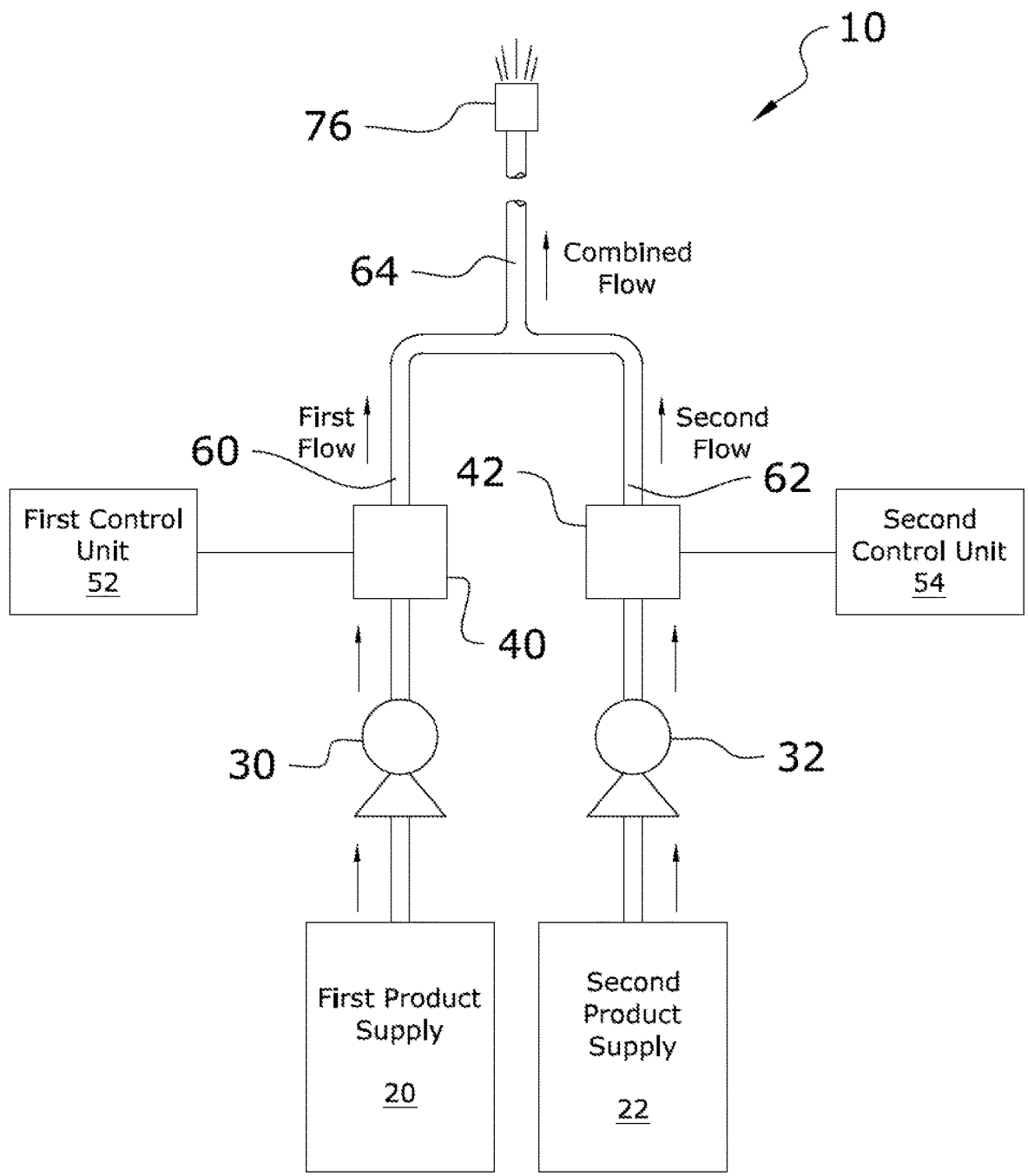
FIG. 2 is a block diagram illustrating the present invention.
Figure 3:
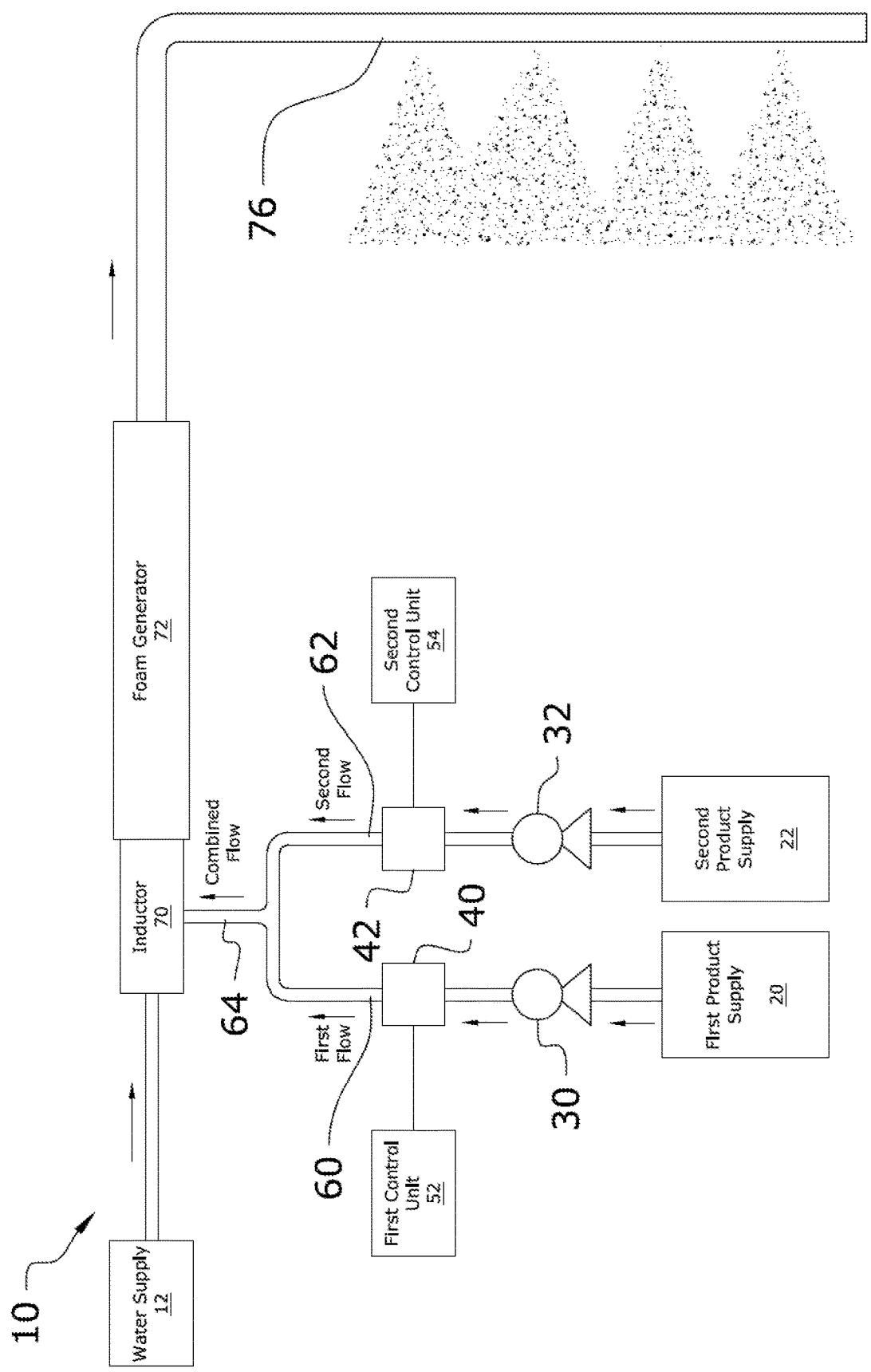
FIG. 3 is a block diagram illustrating the present invention using an inductor and foam generator.
Figure 4:
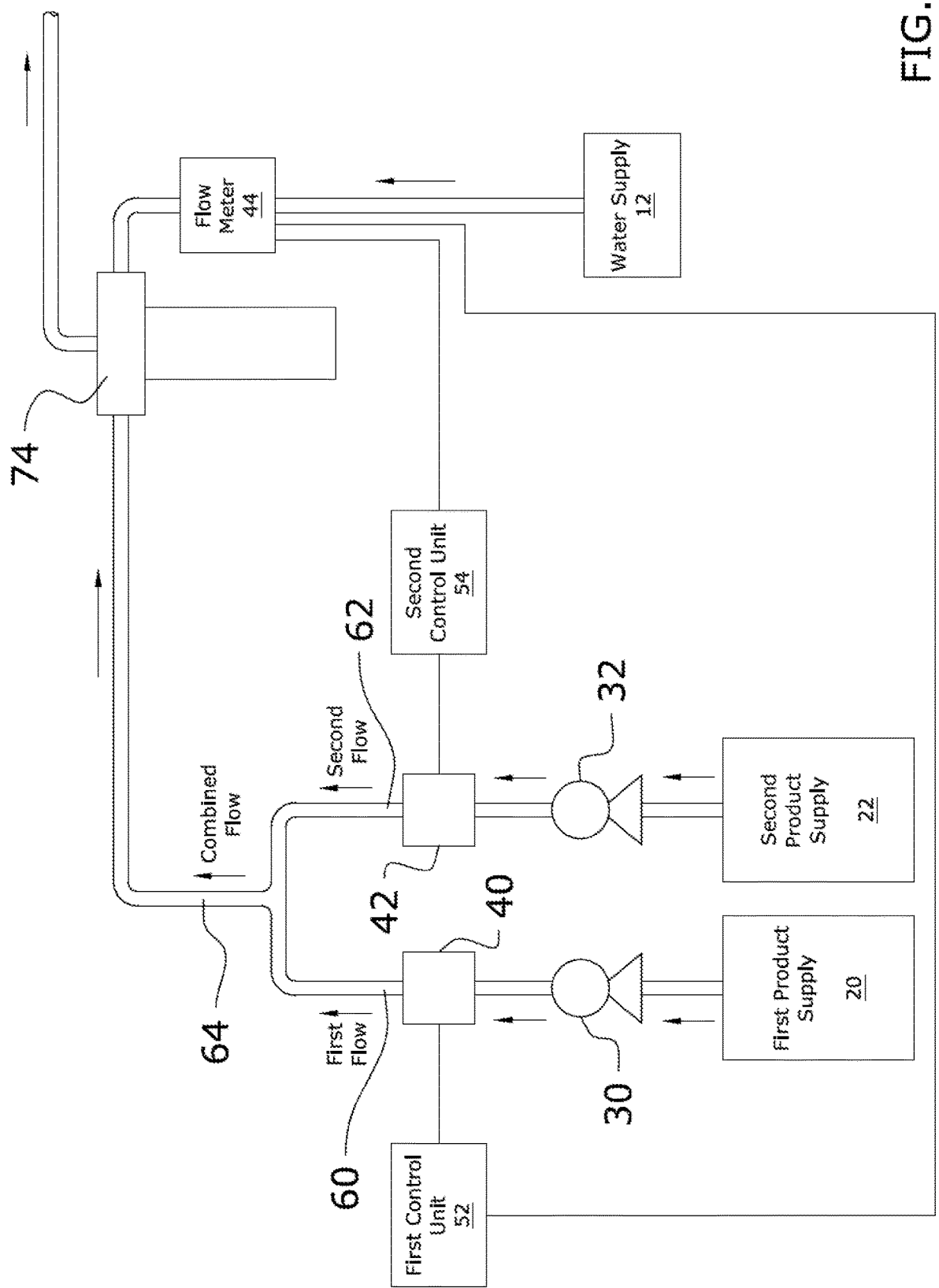
FIG. 4 is a block diagram illustrating the present invention using a reconstituting device.
Figure 5:
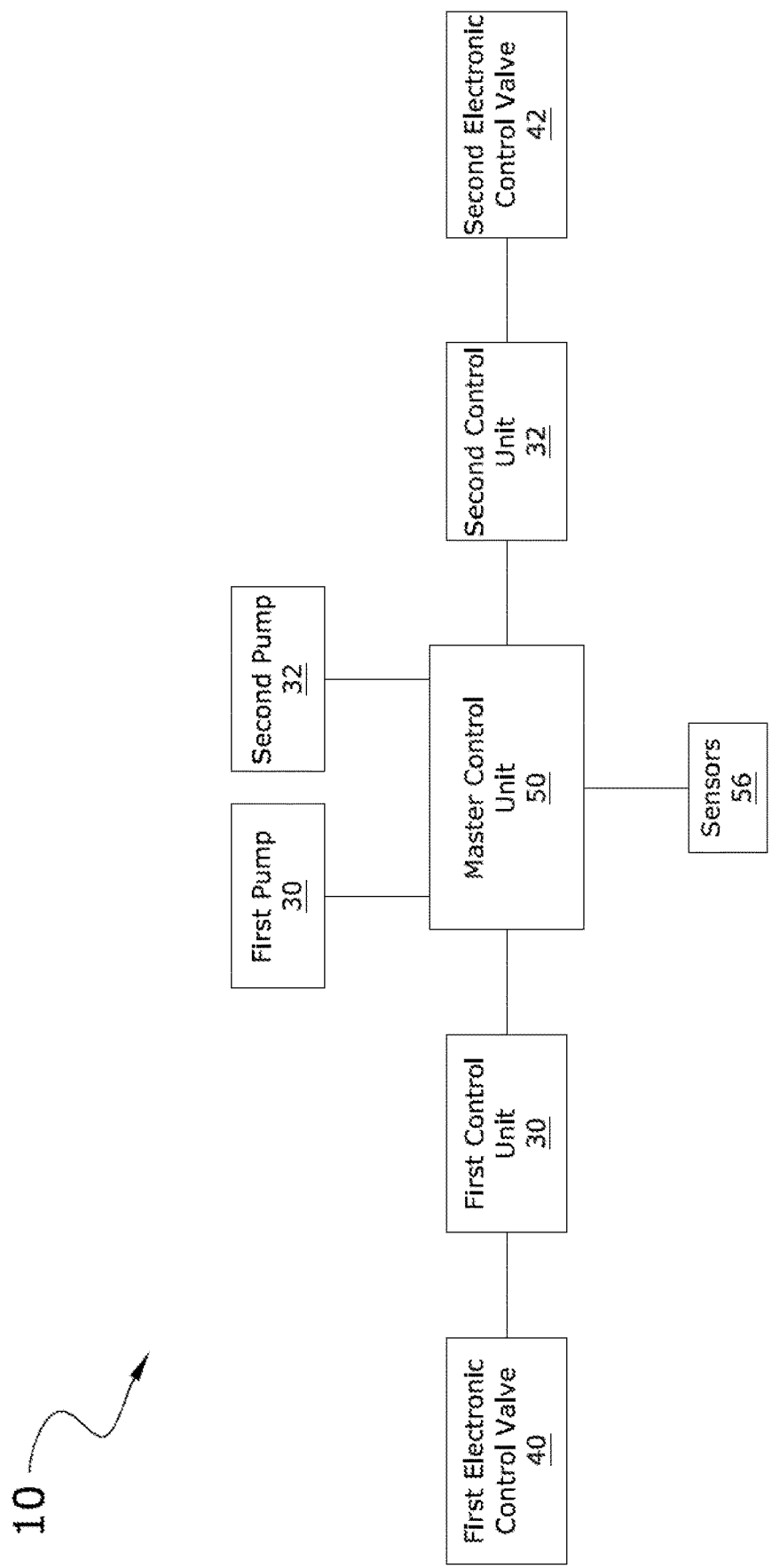
FIG. 5 is a block diagram illustrating an exemplary control system for the present invention.

As shown in FIGS. 2 through 4 of the drawings, a second product supply 22 may be utilized within the present invention and combined with the first product supply 20. The second product supply 22 is metered to a desired flow rate into the first product supply 20 as determined by the master control unit 50.

C. Electronic Control Valves

The present invention preferably utilizes electronic control valves to operating in a pulsing manner to deliver one or more products at a controlled flow rate. It is preferable that the electronic control valves be comprised of solenoid valves capable of operating at various pulse rates, however other types of valves may be utilized.

FIGS. 2 through 5 of the drawings illustrate a first electronic control valve 40 fluidly connected to the first product supply 20. A first pump 30 may be fluidly positioned between the first product supply 20 and the first electronic control valve 40 to provide the first product supply 20 in a pressurized manner. The first electronic control valve 40 is comprised of any valve capable of operating at a first open/close ratio that dispenses the first product supply 20 at a desired first flow rate. The first open/close ratio preferably produces a consistent flow rate of the first product supply 20 to ensure that the end product dispensed by the product dispenser 76 onto the vehicle has the proper ratios of product.

FIGS. 2 through 5 of the drawings also illustrate a second electronic control valve 42 fluidly connected to the second product supply 22. A second pump 32 may be fluidly positioned between the second product supply 22 and the second electronic control valve 42 to provide the second product supply 22 in a pressurized manner. The second electronic control valve 42 is comprised of any valve capable of operating at a second open/close ratio that dispenses the second product supply 22 at a desired second flow rate that has a desired ratio with respect to the first flow rate. The second open/close ratio preferably produces a consistent flow rate of the second product supply 22 to ensure that the end product dispensed by the product dispenser 76 onto the vehicle has the proper ratios of product. As can be appreciated, more than two product supplies metered by a corresponding number of electronic control valves may be utilized within the present invention and the illustration in the figures of two electronic control valves is merely for illustration purposes of a preferred embodiment of the present invention. In addition, a single first electronic control valve 40 may be utilized to control a single first product supply 20 within the vehicle wash.

Figure 7A:
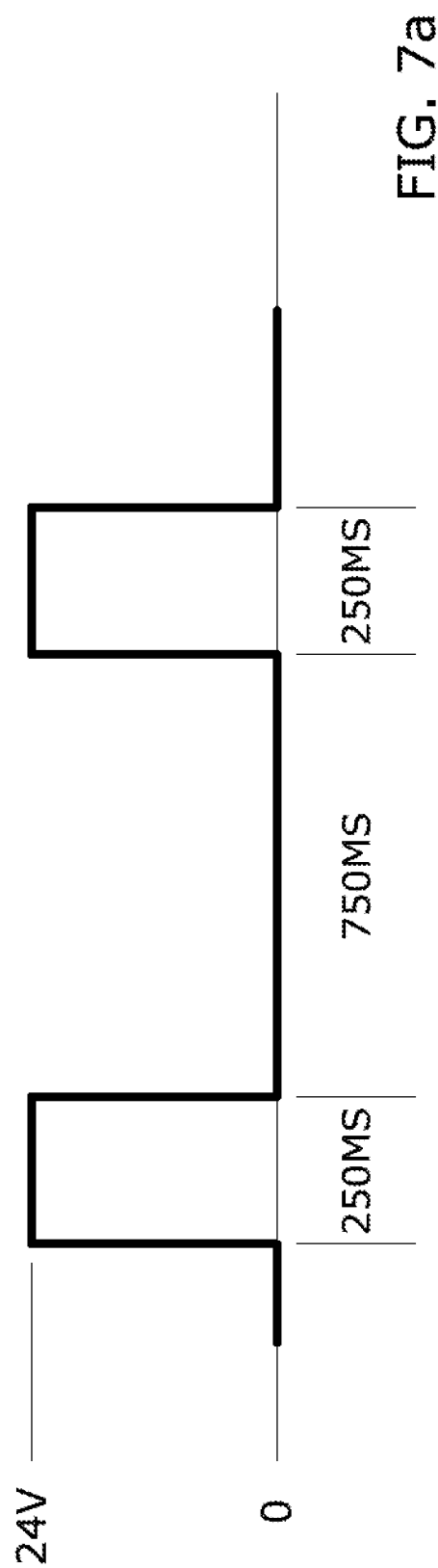
FIG. 7a is a chart illustrating a first open/close ratio for an electronic control valve.
Figure 7B:
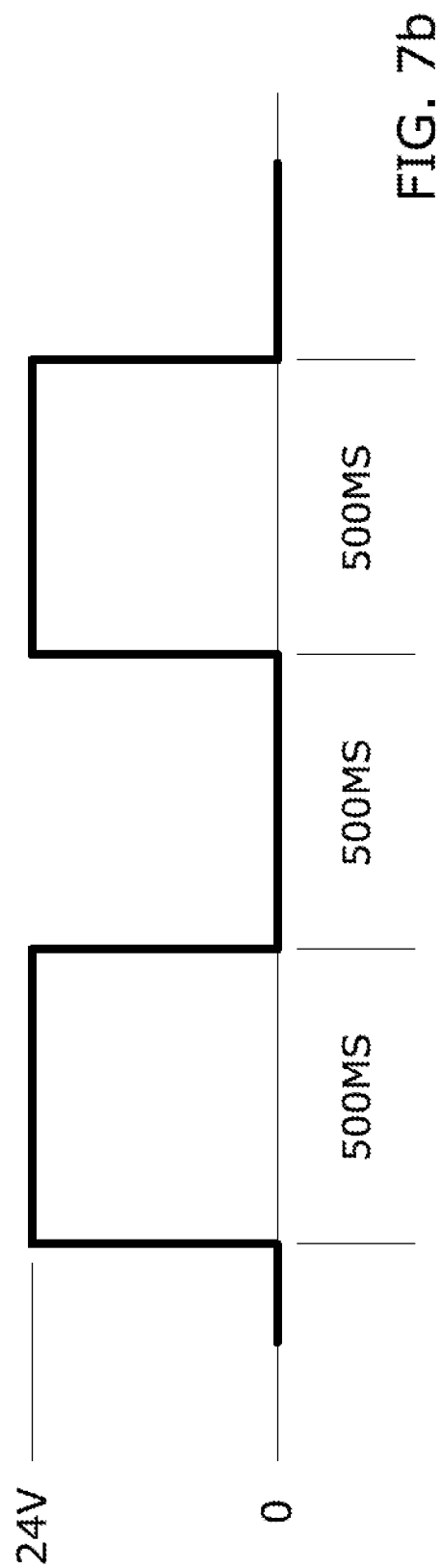
FIG. 7b is a chart illustrating a second open/close ratio for an electronic control valve.

FIGS. 7a and 7b of the drawings illustrate an exemplary open/close ratio that may be used with the electronic control valves. The first open/close ratio and the second open/close ratio may be different or the same depending upon the desired end product ratio. The open/close ratios may be comprised of any ratio that produces the desired flow rate of product to the vehicle wash and that the electronic control valve is capable of being operated at.

D. Control Unit

FIGS. 2 through 5 illustrate a first control unit 52 in communication with the first electronic control valve 40 and a second control unit 54 in communication with the second electronic control valve 42. A master control unit 50 is preferably in communication with the first control unit 52 and the second control unit 54 or the master control unit 50 may be in direct communication with the electronic control valves 40, 42. The control units 50, 52, 54 are preferably programmable to allow the user to adjust the open/close ratios of the electronic control valves 40, 42. The control units 50, 52, 54 may be comprised of any electronic device capable of performing calculations, storing data, receiving data and/or transmitting data.

One or more sensors 56 are preferably in communication with one or more of the control units 50, 52, 54. The sensor 56 detects a condition of the vehicle wash such as but not limited to the end product flow rate being dispensed from the product dispenser 76, temperature, humidity and the like.

E. Fluid Delivery System

FIGS. 2 through 4 of the drawings illustrate exemplary fluid delivery systems utilizing a first product supply 20 and a second product supply 22. As illustrated in FIGS. 2 through 4 of the drawings, a first line 60 is fluidly connected to the first electronic control valve 40 and a second line 62 is fluidly connected to the second electronic control valve 42 to transfer the metered first product supply 20 and second product supply 22 respectively. The first line 60 and the second line 62 are both fluidly connected to a combined line 64 that combines the product supplies 20, 22 and transfers the same to the product dispenser 76 as shown in FIG. 2 of the drawings. The product dispenser 76 may be comprised of any dispensing device capable of dispensing the products onto a vehicle within the vehicle wash (e.g. spray nozzle). If additional product supplies are utilized, additional lines would be added and joined into the combined line 64.

FIG. 3 illustrates a variation of the present invention wherein an inductor 70 is fluidly connected to the combined line 64. In addition, a water supply 12 is fluidly connected to the inductor 70 to provide a supply of water to the inductor 70. The inductor 70 is fluidly connected to a foam generator 72 that generates foam from the water and metered products. The foam is transferred to the product dispenser 76 for dispensing upon the vehicle in the vehicle wash.

FIG. 4 illustrates another variation of the present invention wherein a flow meter 44 is fluidly connected between a water supply 12 and a reconstituting device 74. The combined line 64 is fluidly connected to the reconstituting device 74 and the reconstituted fluid is delivered to the product dispenser 76. As further shown in FIG. 4 of the drawings, the control units 52, 54 are preferably in communication with the flow meter 44 to ensure a proper ratio of dispensed products into the reconstituting device 74 with respect to the water being supplied.

G. Operation of Preferred Embodiment

Figure 6:
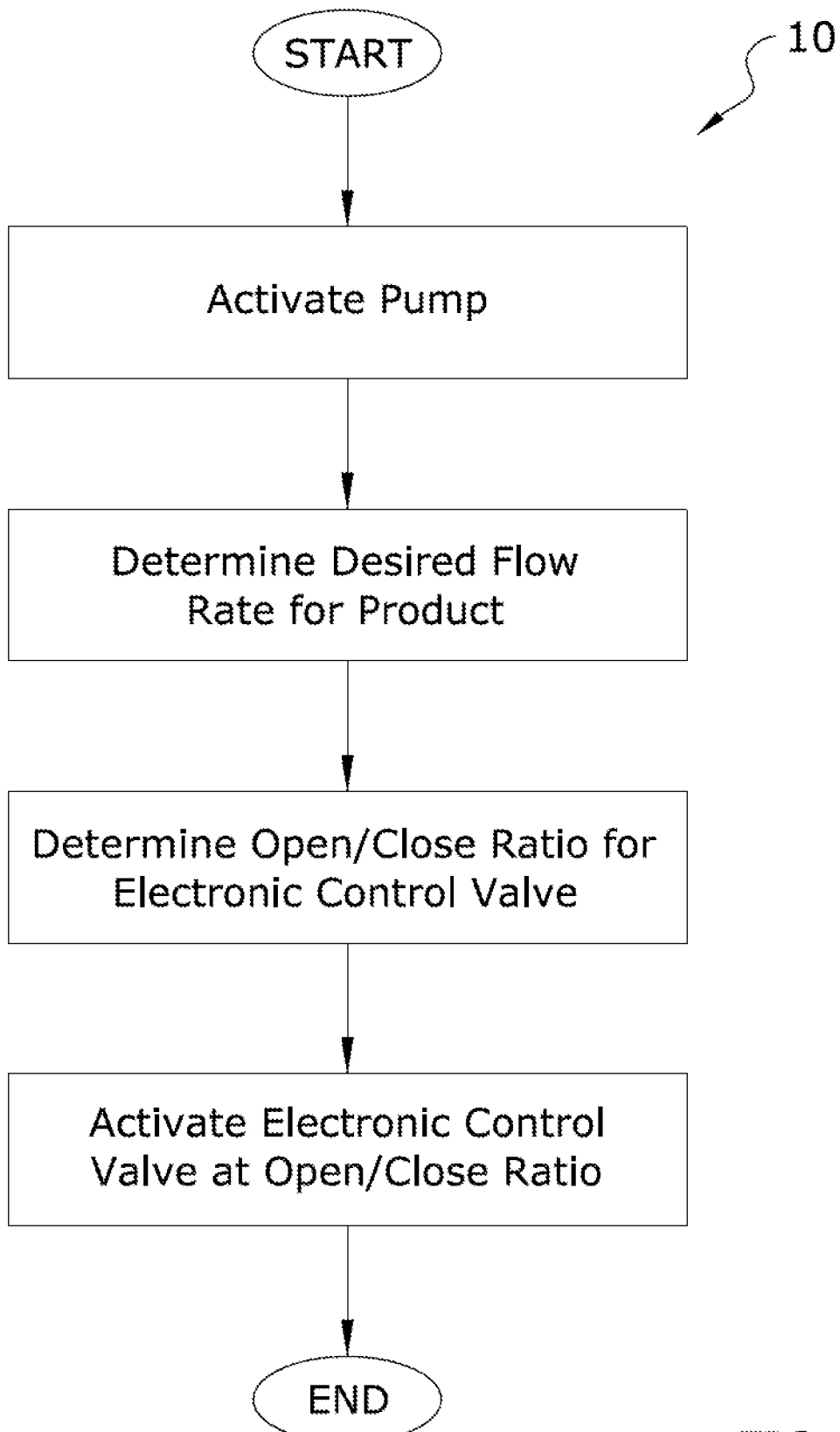
FIG. 6 is a flowchart illustrating the overall operation of the present invention.

FIG. 6 provides a flowchart illustrating the overall operation of the present invention. In particular, the first pump 30 is activated (additional pumps are activated if present). The desired first flow rate for the first product supply 20 is determined either by a preprogrammed flow rate or a flow rate calculated by the first control unit 52. The first control unit 52 determines the open/close ratio needed to produce the desired first flow rate. The open/close ratio is calculated utilizing the pressure and flow rate of the first pump 30, the size of the first electronic control valve 40 and other factors relevant to calculating the first flow rate. The first electronic control valve 40 is thereafter activated according to the determined open/close ration. FIGS. 7a and 7b illustrate an exemplary open/close ratio for the first electronic control valve 40 wherein FIG. 7a illustrates a significantly lower flow rate than the flow rate of FIG. 7b. In FIG. 7a, the first electronic control valve 40 is only open 250 MS and is closed 750 MS. In FIG. 7b, the first electronic control valve 40 is open 500 MS and is only closed 500 MS. Various other open/close ratios may be utilized. In addition, the open/close ratio used for the first control valve may be static or dynamic dependent upon real-time factors (e.g. a change in pump pressure, a change in the amount of water being supplied, etc.).

The present invention is not limited to dispensing only one first product supply 20 (with or without water). The present invention may be utilized to meter and dispense two or more products as discussed previously utilizing a corresponding number of electronic control valves. For example, the present invention may utilize three colored product supplies comprised of three primary colored products to provide an infinite amount of colored products to the vehicle wash (e.g. colored wax). In addition, the present invention may utilize two or more scented product supplies to provide various scented outputs to the vehicle wash.

H. Operation of Alternative Embodiment

Figure 8:
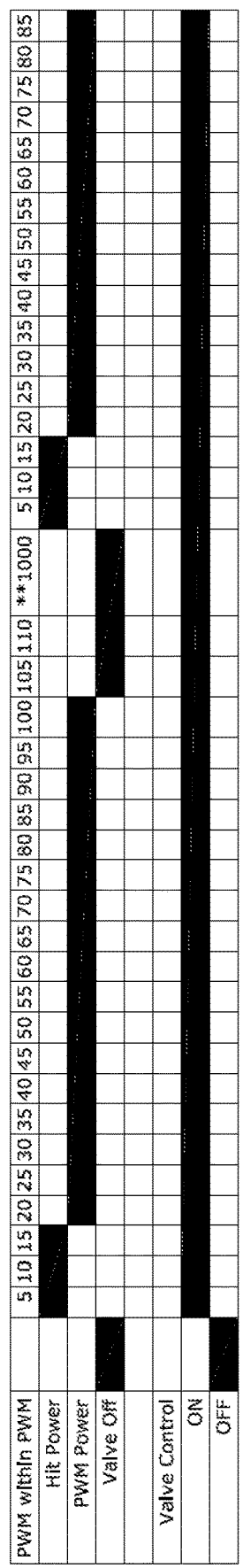
FIG. 8 is a chart illustrating an alternative embodiment utilizing pulse width modulation.

FIG. 8 illustrates an alternative embodiment that reduces the electrical power consumed by the electronic control valve 40, 42. There are two main sections illustrated in FIG. 8: the upper portion illustrates the pulse width modulation utilized to meter a desired product flow rate through the electronic control valve 40, 42; the lower portion illustrates the state of the valve as being on or off to dispense the product. The alternative embodiment allows for a smaller solenoid to be used because the coil does not need to be as large thereby reducing electrical power used, reducing the overall physical size and reducing the cost of the electronic control valve 40, 42. The reduction in size of the solenoid coil is in-part because less heat is required to be dissipated when using the alternative embodiment as discussed below.

The lower portion of the chart in FIG. 8 illustrates the desired on or off flow of a desired product through the electronic control valve 40, 42. As shown in FIG. 8, the initial state is in the OFF state indicating that no electrical power is transmitted to the electronic control valve 40, 42 and therefore no product flows through the electronic control valve 40, 42.

When product is desired to be delivered through the electronic control valve 40, 42, the state is changed to ON as shown by the lower portion of the chart in FIG. 8. When the state is initially changed to ON to deliver a desired product through the electronic control valve 40, 42, the control unit 52, 54 transmits a "Hit Power" which is a constant voltage applied to the valve coil of the electronic control valve 40, 42 to ensure that the electronic control valve 40, 42 is fully opened and in an open state. It has been found that a constant voltage is preferable to open the electronic control valve 40, 42 initially from the closed state and after the electronic control valve 40, 42 is opened then a pulse width modulated (PWM) power may be applied to maintain the electronic control valve 40, 42 in the open state as further shown in FIG. 8 of the drawings. The Hit Power is generally comprised of a high power and is preferably a constant voltage.

As an example of the alternative embodiment shown in FIG. 8 of the drawings, it has been found that a "Hit Power" period set for 15 ms provides sufficient power and time to fully open the electronic control valve 40, 42. It can be appreciated the various other periods of Hit Power may be applied depending upon various factors such as the solenoid coil size and the valve.

After 15 ms, the Hit Power applied to the electronic control valve 40, 42 is reduced to the PWM power thereby reducing the overall power consumed by the valve coil of the electronic control valve 40, 42. The length of time that the PWM power is applied depends upon the desired product flow rate along with the "valve off" time. After a specified period time such as 85 ms as illustrated by the "PWM Power" row, the PWM power is terminated and electrical power supplied to the electronic control valve 40, 42 is terminated for a period of time (e.g. 900 ms) as illustrated by the "Valve Off" row. After the Valve Off period has expired, the Hit Power is applied again for a period of time (e.g. 15 ms) followed by the PWM Power for another period of time (e.g. 85 ms) as illustrated previously. The process continues until the desired amount of product has been dispensed through the electronic control valve 40, 42 and then the valve control is set to OFF thereby closing the electronic control valve 40, 42 into a closed state.

The PWM Power is preferably comprised of the same voltage used for the Hit Power, but is cycled on and off at a high frequency which is at a rate higher than the control valve can change state. The PWM Power is preferably comprised of a high frequency voltage that is adjustable depending upon the electronic control valve 40, 42 and the environmental conditions. As an example, an exemplary frequency for the PWM Power is approximately 5 kHz.

What has been described and illustrated herein is a preferred embodiment of the invention along with some of its variations. The terms, descriptions and figures used herein are set forth by way of illustration only and are not meant as limitations. Those skilled in the art will recognize that many variations are possible within the spirit and scope of the invention, which is intended to be defined by the following claims (and their equivalents) in which all terms are meant in their broadest reasonable sense unless otherwise indicated. Any headings utilized within the description are for convenience only and have no legal or limiting effect.

What is claimed is:

1. A vehicle wash for washing a vehicle, comprising:
   a first pump fluidly connected to a first product supply and a second pump fluidly connected to a second product supply, wherein the first product supply is comprised of a liquid, a powder, a particulate material, a gas, a fluid, or a combination thereof, and wherein the second product supply is comprised of a liquid;
   an first electronic control valve fluidly connected to the first pump, wherein the first electronic control valve operates at a first open/close ratio that dispenses the first product supply at a first flow rate, wherein the first open/close ratio is comprised of an on state for an on period of time and an off state for an off period of time, and wherein the first open/close ratio produces a first flow rate of the first product supply;
   a second electronic control valve fluidly connected to the second pump, wherein the second electronic control valve operates at a second open/close ratio that dispenses the second product supply at a second flow rate, wherein the second open/close ratio is comprised of an on state for an on period of time and an off state for an off period of time, and wherein the second open/close ratio produces a second flow rate of the second product supply;
   a nozzle fluidly connected to the first electronic control valve and the second electronic control valve to dispense the first product supply and the second product supply to the vehicle; and
   a control unit in communication with the first electronic control valve and the second electronic control valve, the control unit is programmed to control the first open/close ratio and the second open/close ratio, wherein the control unit calculates the first open/close ratio needed to produce the first flow rate of the first product supply utilizing a pressure of the first product supply from the first pump, and wherein the control unit calculates the second open/close ratio needed to produce the second flow rate of the second product supply utilizing a pressure of the second product supply from the second pump.

2. The vehicle wash of claim 1, wherein the first product supply is comprised of a powder.

3. The vehicle wash of claim 1, wherein the first product supply is comprised of a particulate material.

4. The vehicle wash of claim 1, wherein the first product supply is comprised of a gas.

5. The vehicle wash of claim 1, wherein the first product supply is comprised of a fluid.

6. The vehicle wash of claim 1, wherein the first product supply is comprised of a liquid and a gas.

7. A product metering system for accurately metering a product to be dispensed, comprising:
   a vehicle wash adapted for washing a vehicle, wherein said vehicle wash includes a first pump fluidly connected to a product supply, wherein said product supply is comprised of a liquid, a powder, a particulate material, a gas, a fluid, or a combination thereof;
   an electronic control valve fluidly connected to said first pump, wherein said electronic control valve operates at an open/close ratio that dispenses said product supply at a flow rate, wherein said open/close ratio is comprised of an on state for an on period of time and an off state for an off period of time, wherein said open/close ratio produces a consistent flow rate of said product supply;
   a product dispenser fluidly connected to said electronic control valve to dispense said product supply to said vehicle; and
   a control unit in communication with said electronic control valve, said control unit programmed to control said open/close ratio, wherein said control unit calculates said open/close ratio needed to produce said flow rate of said product supply utilizing a pressure of said product supply from said first pump;
   wherein said on state is comprised of an initial higher power applied to said electronic control valve for a period of high power time to ensure that said electronic control valve is opened followed by a lower power applied to said electronic control valve for a period of lower power time;
   wherein said initial higher power is comprised of a constant voltage;
   wherein said period of high power time is comprised of approximately 15 ms;
   wherein said lower power is comprised of a pulse width modulated power;
   wherein said period of lower power time is based on a desired product flow rate;
   wherein said off state is comprised of no power applied to said electronic control valve.

8. The product metering system of claim 7, wherein said product supply is comprised of a powder.

9. The product metering system of claim 7, wherein said product supply is comprised of a particulate material.

10. The product metering system of claim 7, wherein said product supply is comprised of a gas.

11. The product metering system of claim 7, wherein said product supply is comprised of a fluid.

12. The product metering system of claim 7, wherein said product supply is comprised of a liquid and a gas.

13. A method of operating a vehicle wash, comprising:
    positioning a vehicle within a vehicle wash, wherein the vehicle wash is comprised of:

a pump fluidly connected to a product supply, wherein the product supply is comprised of a liquid, a powder, a particulate material, a gas, a fluid, or a combination thereof;

an electronic control valve fluidly connected to the pump, wherein the electronic control valve operates at an open/close ratio that dispenses the product supply at a flow rate, wherein the open/close ratio is comprised of an on state for an on period of time and an off state for an off period of time, and wherein the open/close ratio produces a flow rate of the product supply;

a nozzle fluidly connected to the electronic control valve to dispense the product supply to the vehicle; and a control unit in communication with the electronic control valve, the control unit programmed to control the open/close ratio, wherein the control unit calculates the open/close ratio needed to produce the flow rate of the product supply utilizing a pressure of the product supply from the pump;

calculating by the control unit the open/close ratio needed to produce the flow rate of the product supply utilizing the pressure of the product supply from the pump;

operating the electronic control valve at the open/close ratio to produce the flow rate of the product supply; and dispensing the product supply by the nozzle to the vehicle at the flow rate.

14. The method of claim 13, wherein the product supply is comprised of a powder.

15. The method of claim 13, wherein the product supply is comprised of a particulate material.

16. The method of claim 13, wherein the product supply is comprised of a gas.

17. The method of claim 13, wherein the product supply is comprised of a fluid.

18. The method of claim 13, wherein the product supply is comprised of a liquid and a gas.

\* \* \* \* \*